(12) United States Patent
Shimada

(10) Patent No.: US 12,070,855 B2
(45) Date of Patent: Aug. 27, 2024

(54) ROBOT

(71) Applicant: FANUC CORPORATION, Yamanashi (JP)

(72) Inventor: Tadatoki Shimada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/015,176

(22) PCT Filed: Aug. 27, 2021

(86) PCT No.: PCT/JP2021/031513
§ 371 (c)(1),
(2) Date: Jan. 9, 2023

(87) PCT Pub. No.: WO2022/045293
PCT Pub. Date: Mar. 3, 2022

(65) Prior Publication Data
US 2023/0191591 A1    Jun. 22, 2023

(30) Foreign Application Priority Data
Aug. 31, 2020    (JP) ................................ 2020-145567

(51) Int. Cl.
*B25J 9/00* (2006.01)
*B25J 17/00* (2006.01)

(52) U.S. Cl.
CPC ............ *B25J 9/0009* (2013.01); *B25J 17/00* (2013.01)

(58) Field of Classification Search
CPC ................................ B25J 9/0009; B25J 17/00
(Continued)

(56) References Cited

U.S. PATENT DOCUMENTS

2004/0093975 A1 * 5/2004 Amparore ............ B25J 19/0008
901/48
2010/0043587 A1   2/2010 Broberg et al.
(Continued)

FOREIGN PATENT DOCUMENTS

EP         0041136 A1    12/1981
JP         S5721297 A     2/1982
(Continued)

OTHER PUBLICATIONS

International Search Report dated Nov. 2, 2021, for International Patent Application No. PCT/JP2021/031513.

*Primary Examiner* — T. Scott Fix
(74) *Attorney, Agent, or Firm* — KARCESKI IP LAW, PLLC

(57) ABSTRACT

A robot includes a first member and a second member that is rotationally driven about a prescribed axis with respect to the first member. The second member includes a pair of axially spaced-apart flange portions. The second member is supported by the respective flange portions so as to be rotatable about the axis. The robot also includes a balancer that is attached to the first member and the second member so as to be respectively rotatable about attachment axes that are parallel to the axis. In addition, the robot includes an adapter that is inserted between the pair of flange portions. The adapter is attached to the second member in an attachable/detachable manner and disposes the attachment axis of the balancer for the second member at a position that is radially farther inside than outer circumferential surfaces of the flange portions and that is decentered with respect to the axis.

4 Claims, 6 Drawing Sheets

(58) Field of Classification Search
USPC .................................................. 74/490.05
See application file for complete search history.

(56) References Cited

U.S. PATENT DOCUMENTS

| | | |
|---|---|---|
| 2013/0061707 A1 | 3/2013 | Long |
| 2020/0070367 A1 | 3/2020 | Sung et al. |

FOREIGN PATENT DOCUMENTS

| | | |
|---|---|---|
| JP | S62148187 A | 7/1987 |
| JP | S63127893 A | 5/1988 |
| JP | S63229287 A | 9/1988 |
| JP | H0847885 A | 2/1996 |
| JP | H11277479 A | 10/1999 |
| JP | 2004160634 A | 6/2004 |
| JP | 2009050951 A | 3/2009 |
| JP | 2011200989 A | 10/2011 |
| JP | 2014195854 A | 10/2014 |
| JP | 2016030315 A | 3/2016 |
| JP | 2016030317 A | 3/2016 |
| JP | 2019188513 A | 10/2019 |
| JP | 2020093342 A | 6/2020 |
| KR | 20180021463 A | 3/2018 |

* cited by examiner

ROBOT

CROSS-REFERENCE TO RELATED APPLICATION(S)

This is a National Stage Entry into the United States Patent and Trademark Office from International Patent Application No. PCT/JP2021/031513, filed on Aug. 27, 2021, which relies on and claims priority to Japanese Patent Application No. 2020-145567, filed on Aug. 31, 2020, the entire contents of both of which are incorporated herein by reference.

FIELD OF THE INVENTION

The present disclosure relates to a robot.

BACKGROUND OF THE INVENTION

There is a known robot that rotationally drives, by means of a motor, a first arm about a horizontal rotation axis with respect to a rotating body and that includes a balancer that reduces a load torque acting on the motor by utilizing the elastic force of a compression coil spring (for example, see Japanese Unexamined Patent Application, Publication No. 2019-188513).

SUMMARY OF THE INVENTION

An aspect of the present disclosure is a robot including: a first member; a second member that is rotationally driven about a prescribed axis with respect to the first member, the second member including a pair of flange portions disposed with a spacing therebetween in the axial direction, the second member being supported by the respective flange portions with respect to the first member so as to be rotatable about the axis; a balancer that is attached to the first member and the second member so as to be respectively rotatable about attachment axes that are parallel to the axis; and an adapter that is inserted between the pair of flange portions, the adapter being attached to the second member in an attachable/detachable manner, the adapter disposing the attachment axis of the balancer for the second member at a position that is radially farther inside than outer circumferential surfaces of the flange portions and that is decentered with respect to the axis.

DESCRIPTION OF EMBODIMENT(S) OF THE INVENTION

A robot 1 according to an embodiment of the present disclosure will be described below with reference to the drawings.

Figure 1:
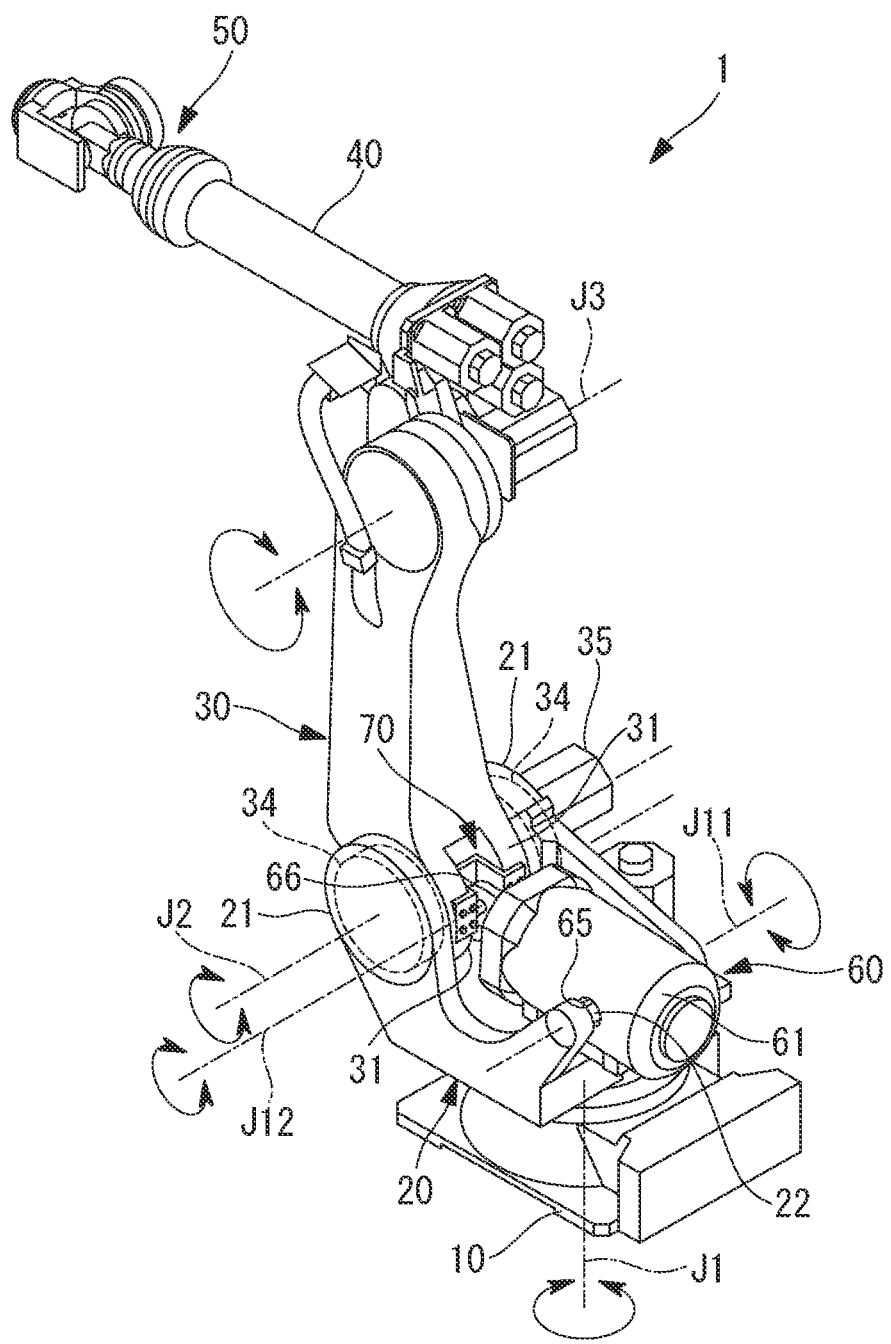
FIG. 1 is an overall configuration diagram of a robot according to an embodiment of the present disclosure.

As shown in FIG. 1, the robot 1 according to this embodiment includes: a base 10 that is installed on a floor surface; and a rotating body (first member) 20 that is supported with respect to the base 10 so as to be rotatable about a first axis J1 extending in a vertical direction.

The robot 1 includes: a first arm (second member) 30 that is supported with respect to the rotating body 20 so as to be rotatable about a second axis (axis) J2 extending in the horizontal direction; and a second arm 40 that is supported with respect to the first arm 30 so as to be rotatable about a third axis J3 that is parallel to the second axis J2. In addition, the robot 1 includes: a three-axis wrist unit 50 that is attached to a distal end of the second arm 40; a balancer 60 that is disposed between the rotating body 20 and the first arm 30; and an adapter 70 that attaches the balancer 60 to the first arm 30 in an attachable/detachable manner.

A pair of disc-shaped flange portions 31 that are disposed with a spacing therebetween in a direction along the second axis J2 and that extend in a direction orthogonal to the second axis J2 are integrally provided at a basal end of the first arm 30.

A pair of support portions 21 that are disposed at positions sandwiching the pair of flange portions 31 of the first arm 30 from outside in the direction along the second axis J2 are provided in the rotating body 20.

Reducers 34 are disposed, one each, between each of the flange portions 31 and each of the support portions 21. A motor 35 is secured to one of the support portions 21, and rotations of a motor shaft (not shown) are input to both of the pair of reducers 34. The two reducers 34 decelerate the rotations of the motor shaft at the same reduction ratio and transmit the rotations to the respective flange portions 31. Accordingly, the first arm 30 is rotated about the second axis J2 with respect to the rotating body 20, and a load torque acting on the first arm 30 is received by the two reducers 34 in such a manner as to be distributed therebetween.

Figure 2:
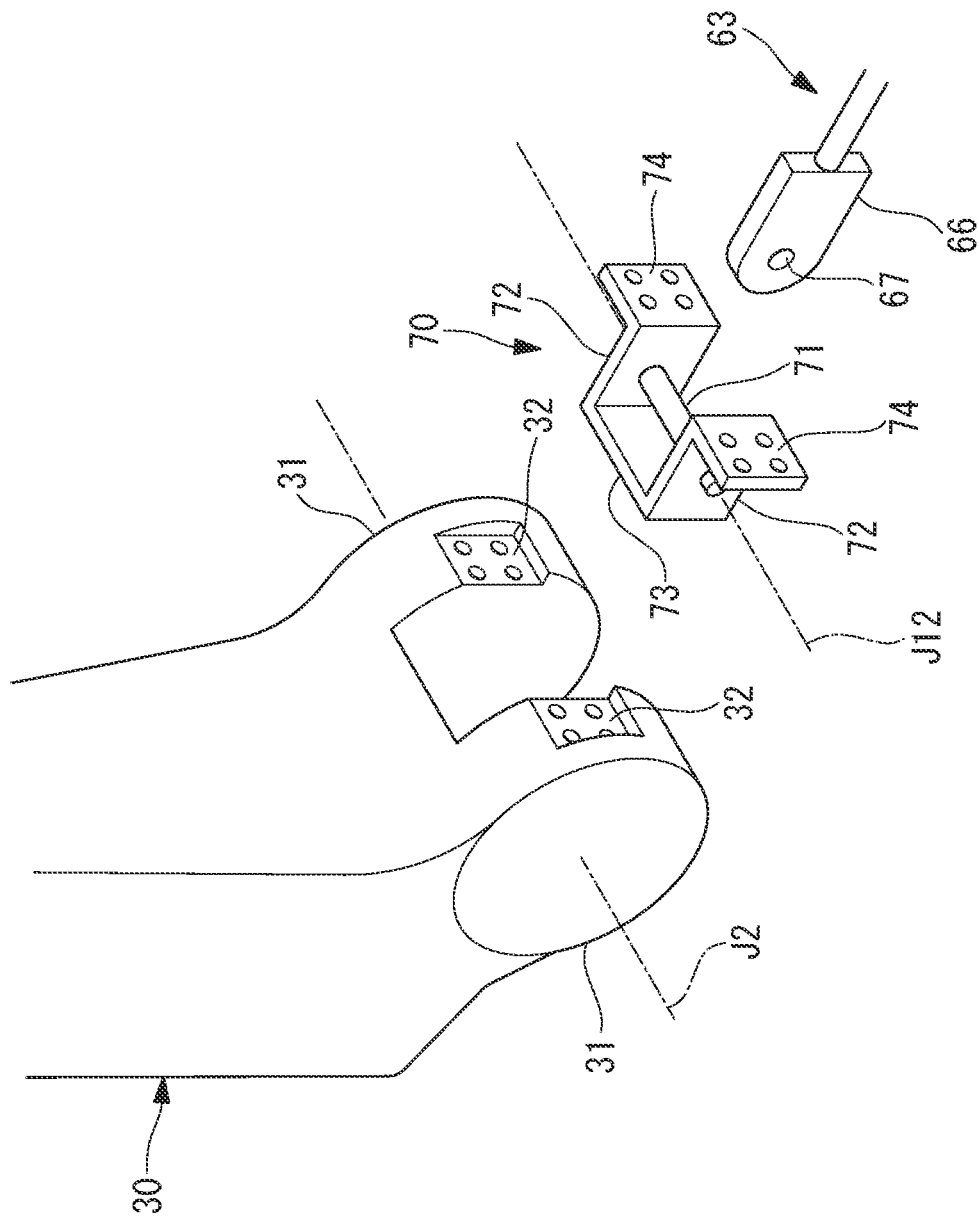
FIG. 2 is an exploded view of a first arm and an adapter of the robot in FIG. 1.

As shown in FIG. 2, on outer circumferential surfaces of the respective flange portions 31, seating surfaces 32 that are disposed closer to the balancer 60 in a state in which the first arm 30 is disposed in the vertical direction are provided. The respective seating surfaces 32 are provided with a plurality of screw holes for securing the adapter 70, described later.

Figure 3:
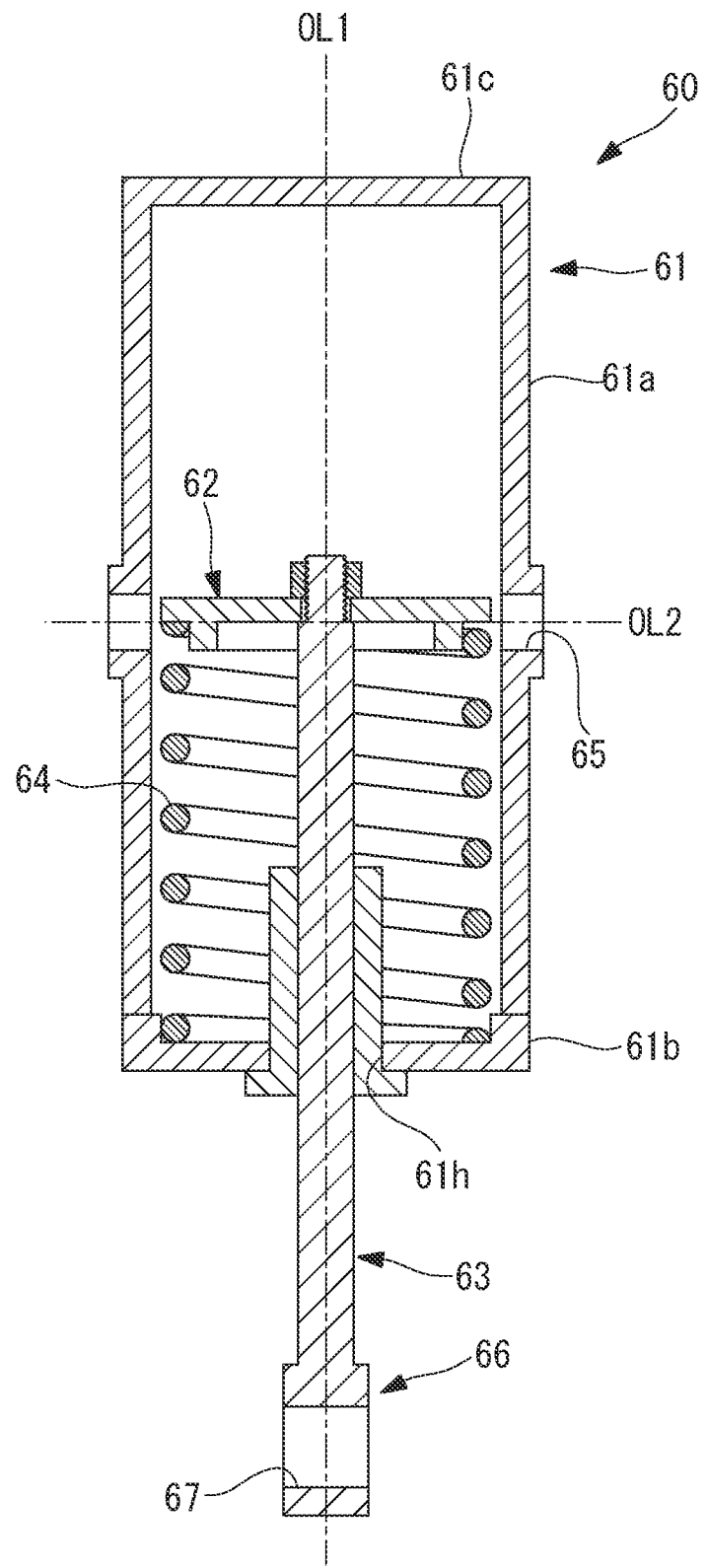
FIG. 3 is a sectional view showing, in outline, a balancer of the robot in FIG. 1.

As shown in FIG. 3, the balancer 60 includes: a housing 61; a disc-shaped movable member 62 that is accommodated in the housing 61 so as to be movable in a longitudinal axis OL1 direction; an elongated rod 63; and a compression coil spring 64.

The housing 61 includes: a cylindrical body portion 61a; and end plates 61b and 61c that respectively block two ends of the body portion 61a in the longitudinal axis OL1 direction. The end plate 61b is provided with, at the center thereof, a through-hole 61h that penetrates therethrough in a direction along the longitudinal axis OL1 of the body portion 61a. The rod 63 passes through the through-hole 61h in the longitudinal axis OL1 direction in a movable manner.

One end of the rod 63 disposed inside the housing 61 is secured to the movable member 62, and an attachment block 66 is secured to the other end of the rod 63 disposed outside the housing 61.

The compression coil spring 64 is accommodated in the housing 61 in a state in which the compression coil spring 64 is sandwiched between the movable member 62 and the end plate 61b. Accordingly, the movable member 62 is pressed toward the end plate 61c along the longitudinal axis OL1 by an elastic restoring force of the compression coil spring 64, and the rod 63 is forced in a direction in which the rod 63 is pulled into the housing 61.

First attachment holes 65 that extend along an orthogonal axis OL2, which is orthogonal to the longitudinal axis OL1, are provided in the body portion 61a of the housing 61 at intermediate positions in the longitudinal axis OL1 direction, for example, on both sides in the diameter direction at center positions. A pair of first shafts 22 that extend in a direction along a first attachment axis (attachment axis) J11, which is parallel to the second axis J2, are inserted into the respective first attachment holes 65.

The first shafts 22 are secured to the rotating body 20. Accordingly, the balancer 60 is attached to the rotating body 20 so as to be rotatable about the first attachment axis J11.

A second attachment hole 67 that extends in a direction orthogonal to the longitudinal axis OL1 is provided in the attachment block 66.

As shown in FIG. 2, the adapter 70 includes: a second shaft (shaft) 71 fitted into the second attachment hole 67 of the attachment block 66 in a rotatable manner; and a pair of substantially parallel strip-like support plates 72 that support two ends of the second shaft 71. In addition, the adapter 70 includes: a joining portion 73 that connects one end of one of the support plates 72 with one end of the other support plate 72; and a pair of securing portions 74 that extend from the other ends of the support plates 72 in a direction orthogonal to the support plates 72.

The pair of support plates 72 are provided with through-holes that penetrate therethrough in a plate-thickness direction, and the second shaft 71 is secured, in an attachable/detachable manner, in a direction in which the second shaft 72 passes through the through-holes.

The adapter 70 is attached to a distal end of the rod 63 by securing, to the support plates 72, the second shaft 71 fitted into the second attachment hole 67 of the attachment block 66. Also, the adapter 70 is secured to the first arm 30 by inserting, between the pair of flange portions 31, the pair of support plates 72 securing the second shaft 71 and by fastening, to the screw holes of the seating surfaces 32 of the first arm 30, bolts passing through the through-holes of the securing portions 74 of the adapter 70. Accordingly, the second shaft 71 is disposed radially farther inside than the outer circumferential surfaces of the flange portions 31 along a second attachment axis (attachment axis) J12 that is parallel to the second axis J2, and the distal end of the rod 63 of the balancer 60 is attached to the first arm 30 so as to be rotatable about the second attachment axis J12.

The operation of the thus-configured robot 1 according to this embodiment will be described below.

Figure 4:
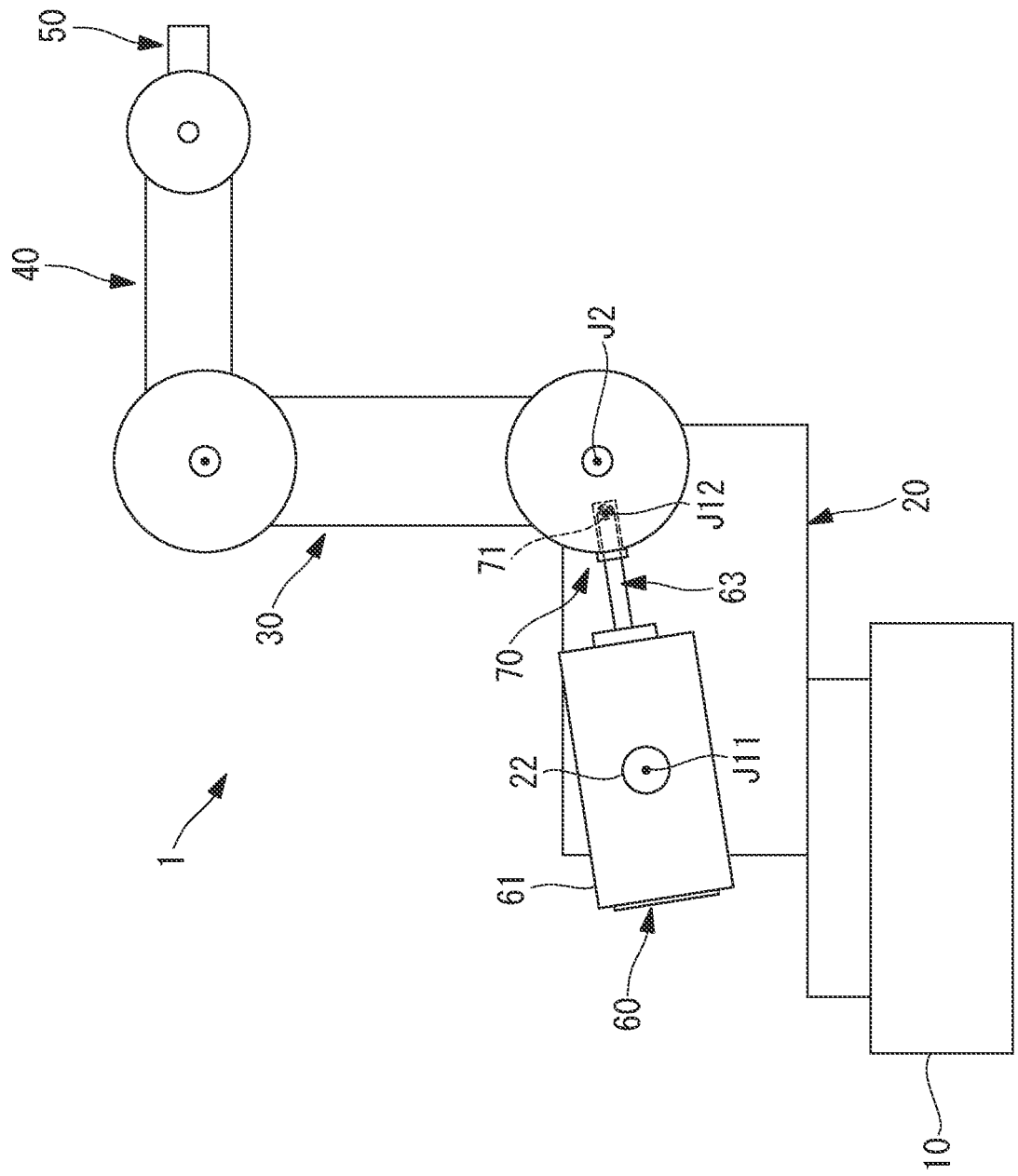
FIG. 4 is a schematic view of the robot in FIG. 1, showing a state in which the first arm is in a vertical orientation.

In the robot 1 according to this embodiment, for example, as shown in FIG. 4, the second attachment axis J12 is disposed in a plane containing the first attachment axis J11 and the second axis J2 in a state in which the first arm 30 is extended in the vertical direction.

Specifically, in this state, the amount by which the rod 63 protrudes from the housing 61 is minimized, and the amount by which the compression coil spring 64 is compressed is also minimized. In addition, because the second attachment axis J12 is disposed in the plane containing the second axis J2 and the first attachment axis J11, the auxiliary torque about the second axis J2 due to the balancer 60 is not generated.

Figure 5:
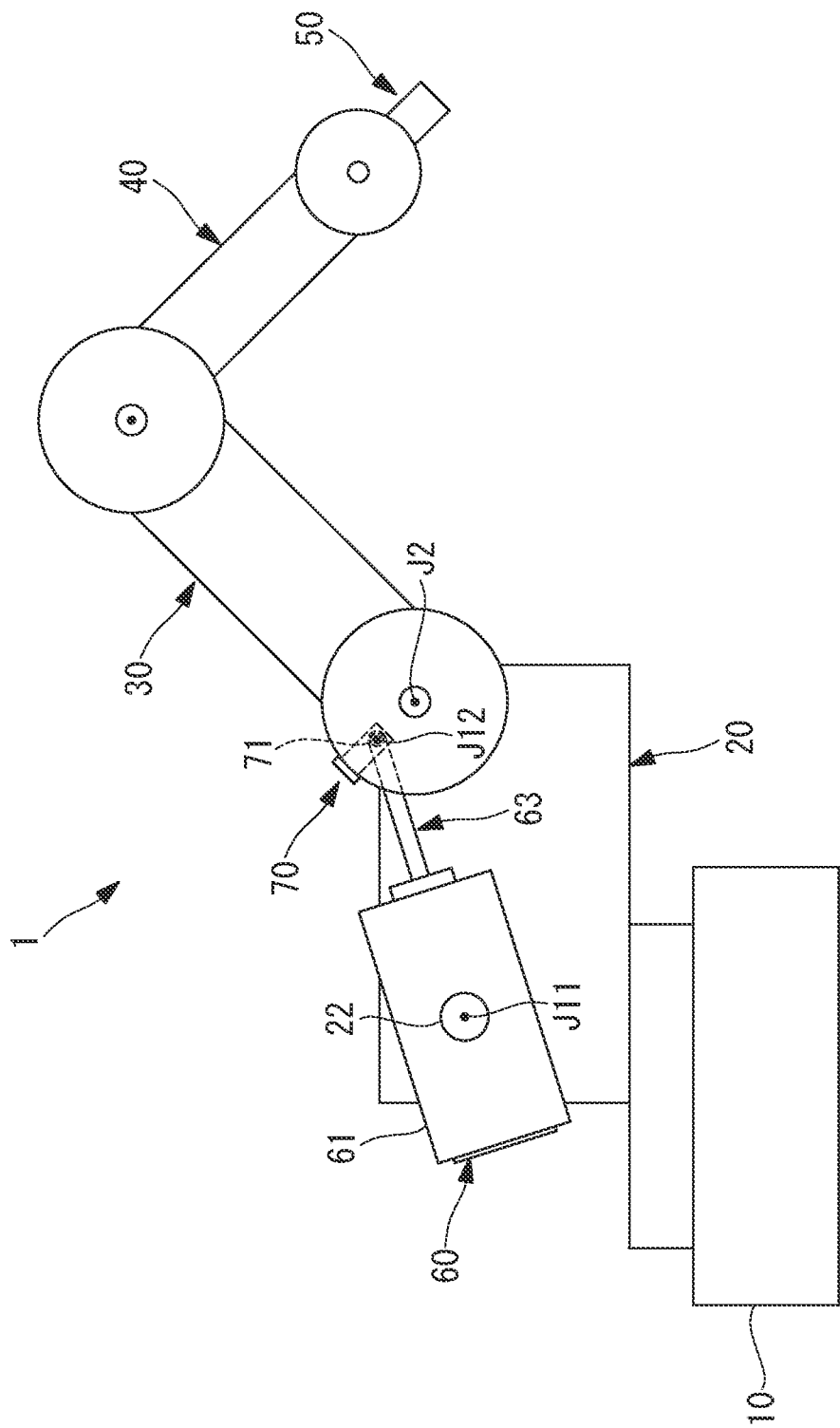
FIG. 5 is a schematic view of the robot in FIG. 1, showing a state in which the first arm is tilted.

From this state, when the first arm 30 is rotated about the second axis J2 by activating the motor 35, as shown in FIG. 5, the tilting angle of the first arm 30 with respect to the vertical direction increases, and the gravitational load torque acting on the first arm 30 increases due to gravity.

At the same time, the second attachment axis J12, which is decentered with respect to the second axis J2, is moved in a direction away from the first attachment axis J11 about the second axis J2 in accordance with the rotation of the first arm 30.

The balancer 60 causes the housing 61 to rotate about the first attachment axis J11 in correspondence with the movement of the second attachment axis J12 with respect to the first attachment axis J11 and increases the amount by which the rod 63 protrudes from the housing 61. Accordingly, the compression amount of the compression coil spring 64 increases, and the force in the direction in which the rod 63 is pulled back into the housing 61 increases.

In addition, when the second attachment axis J12 moves out of the plane containing the first attachment axis J11 and the second axis J2, an auxiliary torque, which is obtained by multiplying the length of the normal drawn to the longitudinal axis OL1 of the rod 63 from the second axis J2 by the resilience of the compression coil spring 64, acts in the opposite direction from the gravitational load torque. The magnitude of the auxiliary torque increases with an increase in the tilting angle of the first arm 30 with respect to the vertical line.

In this case, with the robot 1 according to this embodiment, as a result of employing the adapter 70, the second shaft 71 is disposed radially farther inside than the outer circumferential surfaces of the flange portions 31. Accordingly, it is possible to sufficiently reduce the distance by which the second attachment axis J12 is decentered with respect to the second axis J2, and it is possible to keep the stroke of the rod 63, corresponding to the movable range of the first arm 30 about the second axis J2, small.

Specifically, by keeping the stroke of the rod 63 small, it is possible to reduce the overall length of the compression coil spring 64. Accordingly, it is possible to achieve, as a result of keeping the effective number of windings small, a high rigidity without increasing the wire diameter and the external diameter of the compression coil spring 64. As a result, there is an advantage in that it is possible to achieve an even greater auxiliary torque while preventing an increase in the size of the balancer 60.

In particular, even if the pair of reducers 34 are attached, one each, to each of the pair of flange portions 31, the second shaft 71 is easily disposed, from a direction intersecting the second axis J2, radially farther inside than the outer circumferential surfaces of the flange portions 31 by using the adapter 70. Also, as a result of attaching the adapter 70 to the first arm 30 in an attachable/detachable manner, there is an advantage in that it is possible to easily attach/detach the balancer 60 to/from the first arm 30 without having to remove the reducers 34 and the motor 35.

In addition, the second shaft 71 is supported at both ends by the pair of flange portions 31 via the pair of support plates 72; therefore, even if the resilience generated by the balancer 60 increases, it is possible to maintain firm support while suppressing the deformation of the second shaft 71.

Note that, in this embodiment, the case in which the first arm 30 is tilted in one direction (forward) has been described; however, it is possible also to generate an auxiliary torque in the direction in which the gravitational load torque is reduced in a similar manner in the case in which the first arm 30 is tilted in the other direction (rearward).

In addition, the securing portions 74 of the adapter 70 are secured, from the balancer 60 side, to the seating surfaces 32 provided on the outer circumferential surfaces of the flange portions 31. Accordingly, by fastening bolts to the screw holes of the seating surfaces 32, it is possible to secure the adapter 70 to the first arm 30 while applying an initial compression to the compression coil spring 64.

In contrast, the securing portions 74 may be attached to seating surfaces 32 provided on outer circumferential surfaces on the opposite side, across the first arm 30, from the balancer 60.

Figure 6:
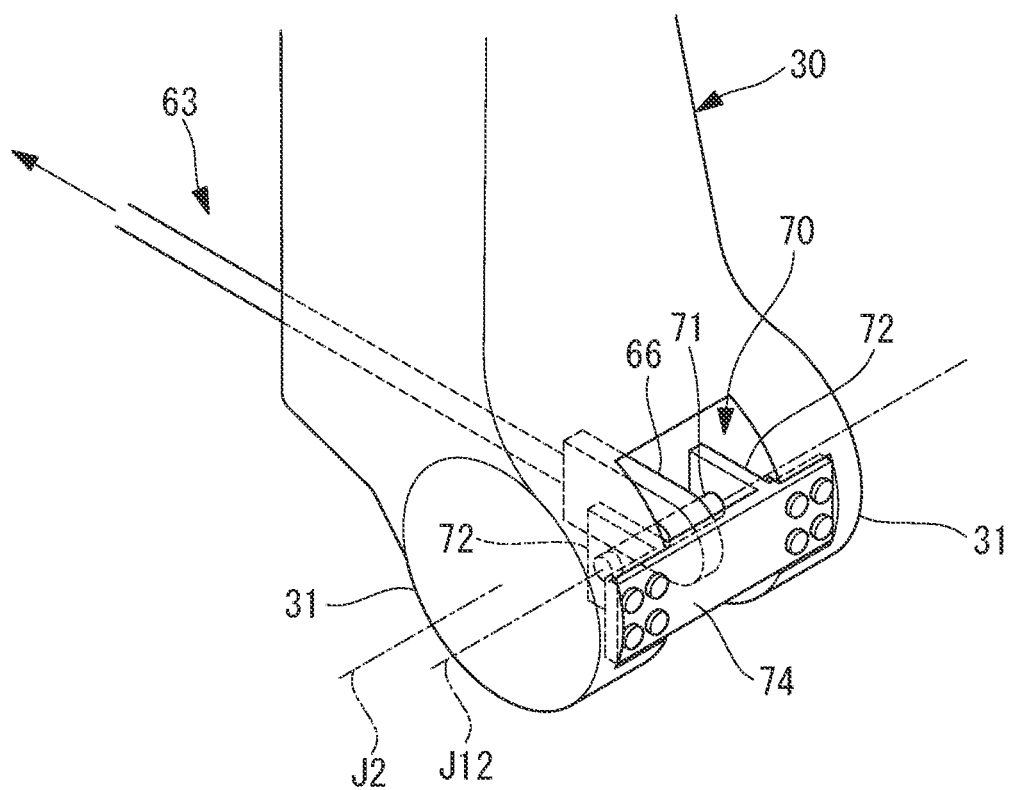
FIG. 6 is a partially enlarged view of a modification of the robot in FIG. 1, showing an attachment state of the first arm and the adapter.

In this case, for example, as shown in FIG. 6, a flat-plate-like securing portion 74 that connects one-side ends of the pair of support plates 72 with each other may be provided.

Accordingly, a force that pulls the rod 63 toward the housing 61 constantly presses the securing portion 74 against the seating surfaces 32 of the first arm 30 via the second shaft 71; therefore, it is possible to reduce the fastening forces of the bolts that attach the adapter 70 to the first arm 30.

Therefore, it is possible to keep the sizes and the quantity of the bolts used small, and it is possible to reduce the size and the weight of the adapter 70.

In addition, in this embodiment, the pair of reducers 34 are disposed at positions sandwiching the flange portions 31 from outside; however, there is no limitation thereto, and a single reducer 34 or three or more reducers 34 may be disposed.

The invention claimed is:

1. A robot comprising:
   a first member;
   a second member that is rotationally driven about an axis with respect to the first member, the second member comprising a pair of flange portions disposed with a spacing therebetween in the axial direction, the second member being supported by the respective flange portions with respect to the first member so as to be rotatable about the axis;
   a balancer that is attached to the first member and the second member so as to be respectively rotatable about attachment axes that are parallel to the axis; and
   an adapter comprising a pair of support plates inserted between the pair of flange portions, and a pair of securing portions being respectively secured to outer circumferential surfaces of the flange portions and being configured to be detachable, the adapter disposing the attachment axis of the balancer for the second member at a position that is radially farther inside than the outer circumferential surfaces and that is decentered with respect to the axis, by the pair of securing portions being secured to the respective circumferential surfaces.

2. The robot according to claim 1, wherein the adapter is attached to a portion of the second member on an opposite side, across the axis, from the attachment axis of the first member.

3. The robot according to claim 1, wherein the adapter comprises a a shaft that is supported, at two ends thereof, by the pair of securing portions, and that attaches one end of the balancer so as to be rotatable about the attachment axis.

4. The robot according claim 1, wherein the balancer is a cylindrical balancer with a built-in compression coil spring.

* * * * *